Sept. 10, 1957   J. J. DAVIS ET AL   2,805,783
LUMBER HANDLING APPARATUS
Filed May 4, 1955   6 Sheets-Sheet 3

Fig. 5.

Inventors
John J. Davis
Clifford D. Curtis
George J. Procknow
By
Attorney

United States Patent Office

2,805,783
Patented Sept. 10, 1957

2,805,783
LUMBER HANDLING APPARATUS

John J. Davis, Clifford D. Curtis, and George J. Procknow, Oshkosh, Wis., assignors to Paine Lumber Co. Ltd., Oshkosh, Wis., a corporation of Wisconsin Application May 4, 1955, Serial No. 505,924

10 Claims. (Cl. 214—44)

This invention concerns lumber processing in so far as it relates to the transfer of lumber from a stack thereof to a point remote from the stack, and it has more particular reference to the unloading of lumber delivered to the processor in railroad cars and the transfer of such lumber to a station remote from the cars and at which processing of the lumber may be said to begin.

Heretofore, processors of lumber were faced with the particularly annoying problem of having to rely upon laborious hand methods of unloading lumber received in carload lots, while having long ago developed and adopted labor saving mechanisms and apparatus for practically all other phases of processing of the lumber.

Thus, for instance, in the unloading of lumber from a railroad car, the lumber was manually removed piece by piece and stacked upon small trucks or other conveyances employed to facilitate the delivery of the unloaded lumber either to a kiln or to the storage yard. During the stacking of the lumber on these conveyances, it was also necessary for one or more workmen to insert stickers between each course of boards laid on the truck to assure the circulation of air between the several layers of lumber in the stack.

These time consuming hand methods of handling the lumber made it seldom possible to unload a carload of lumber in less than two full days, even though several workmen were employed in the unloading operation.

With this problem in mind, it is the object of this invention to provide apparatus which greatly facilitates the transfer of lumber from a stack thereof, as for instance, the piles of lumber in a railroad car, to a point remote from that at which unloading is effected and at which processing of the lumber may be said to begin.

More particularly, it is a purpose of this invention to provide lumber handling apparatus which features an elongated trough structure having endless conveyor means in its bottom, and which has a power driven feed-off roller mounted thereon to propel boards into the trough as a consequence of placement of one end portion of boards from the top of a stock thereof onto the feed-off roller.

Still another purpose of this invention is to provide lumber unloading apparatus of the character described in which the trough structure is adjustable vertically to enable the feed-off roll thereon to be positioned close to the level of the topmost boards on the stack to be unloaded, so that a single workman may easily slide boards one by one from the top of the stack and onto the feed-off roll for propulsion thereby into the trough, from whence the boards are carried to a point remote from the stack of lumber being unloaded.

Still another object of this invention resides in the provision of lumber handling apparatus of the character described in which the trough structure is mounted upon a mobile carriage which, in turn, is mounted for a substantial degree of motion in opposite directions substantially crosswise of the trough, so as to enable the apparatus to be moved to a receiving position directly adjacent to one side of a boxcar to be unloaded or to a point remote from said receiving position providing adequate clearance for driving the boxcar to and from an unloading station by means of the usual freight engine.

Still another object of this invention resides in the provision of lumber handling apparatus of the character described wherein the trough conveyor carries lumber fed into the trough onto a delivery conveyor having its receiving end coupled with the discharge end of the trough by novel means which provides for up and down swinging adjustment of the receiving end of the delivery conveyor, in unison with the trough, about a fixed axis at the other end of the delivery conveyor, and at the same time provides for back and forth bodily movement of the carriage and the trough structure thereon relative to the delivery conveyor in directions normal to the length of the trough without disrupting its connection with the delivery conveyor.

Another object of the invention resides in the provision of a power driven feed-off roll which is mounted on the trough structure at the feed side thereof so as to extend laterally outwardly from the trough into the interior of a boxcar through the open door thereof, and wherein the feed-off roll is also movable bodily lengthwise along the feed side of the trough to enable positioning of the roll adjacent to the end of either stack of lumber in the boxcar. In addition, it is a further feature of the invention that the feed-off roll is supported for adjustment about a vertical axis to enable the roll to be turned toward either end of the trough to thus facilitate unloading of lumber from either of two stacks in the opposite end portions of the boxcar, thus obviating the necessity of reversing the position of the car on its siding.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 6—6a (on two sheets) is an enlarged sectional view through the apparatus, taken along the line of 6—6a of Figure 3;

Figure 1:
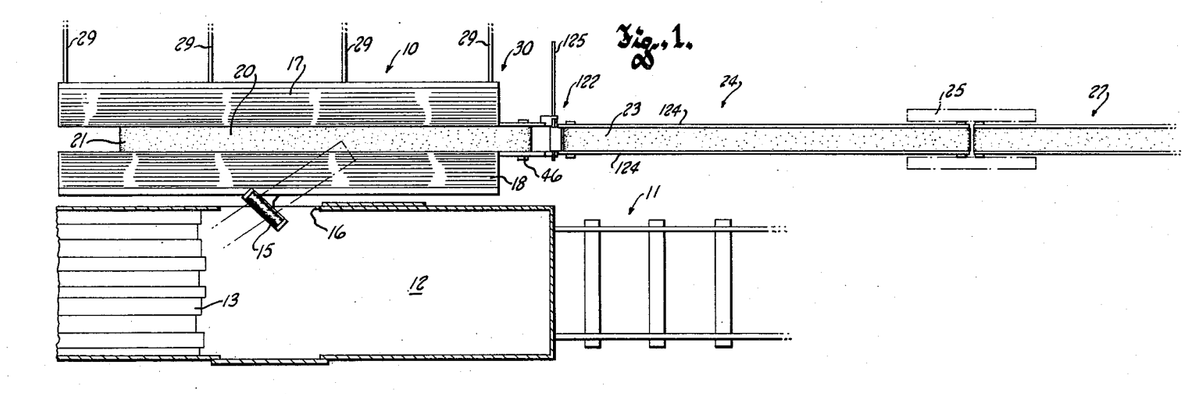
Figure 1 is a plan view diagrammatically illustrating the lumber handling apparatus of this invention and the manner in which it is employed to facilitate the unloading of lumber from a railroad car.
Figure 2:
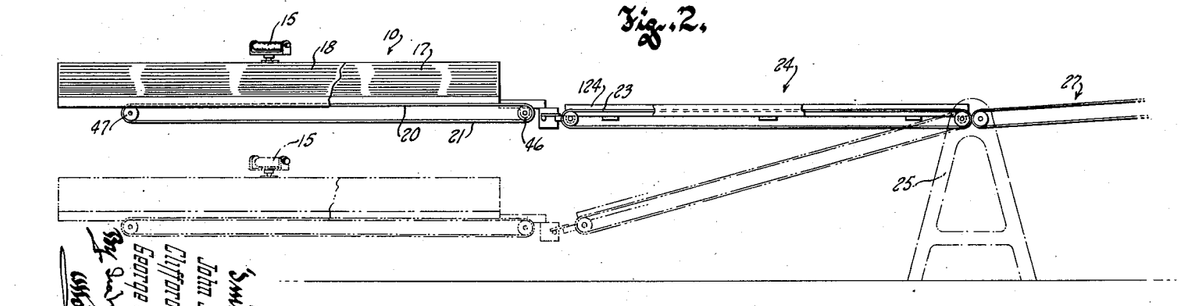
Figure 2 is a side elevational view diagrammatically illustrating the apparatus shown in Figure 1, and indicating the extent of vertical adjustment thereof without disruption of the connection between the trough and the delivery conveyor at the outlet end thereof.

Referring now more particularly to the accompanying drawings, in which like numerals indicate like parts throughout the several views, the purpose of the lumber unloading apparatus of this invention is diagrammatically portrayed by Figures 1 and 2. As therein seen, the apparatus comprises an elongated trough structure 10, shown in a receiving position lengthwise adjacent to a railroad siding 11, with the feed side of the trough directly adjacent to one side of a boxcar 12 on the siding so as to receive boards 13 fed into the trough from a stack thereof in either end of the boxcar.

With the apparatus in the receiving position shown in Figure 1, a power driven feed-off roll 15 mounted on the trough structure intermediate its ends and at the feed side thereof, projects into the interior of the boxcar through the door opening 16 thereof, to occupy a position alongside the adjacent end of the stack of boards 13 at one end of the car, so that boards may be slid from the stack one by one onto the feed-off roll 15. The feed-off roll is positioned at an angle generally crosswise of the trough and faces the right hand or discharge end of the trough, so that boards placed on the feed-off roll will be propelled into the trough toward the discharge end thereof. Since the trough is provided with opposite elongated side walls 17 and 18 of substantial height and which converge toward the bottom of the trough, the angular position of the feed-off roll is not critical and it may propel boards against the far side wall 17 of the trough. Boards thus fed into the trough slide down onto the top stretch 20 of a feed or receiving conveyor 21 carried by the trough structure. The top stretch 20 of the feed conveyor, of course, provides the bottom of the trough.

The receiving conveyor 21 is driven in such a direction that its top stretch 20 travels to the right, as seen in Figure 1. Thus, boards fed into the trough are conducted by the conveyor 21 toward and out of the discharge end of the trough and onto the receiving end 23 of an endless delivery conveyor 24 which aligns endwise with the receiving conveyor in the receiving position of the unloading apparatus shown in Figure 1. As will be discussed at greater length hereafter, a novel connection is provided between the receiving end 23 of the delivery conveyor and the discharge end of the trough 10 whereby the receiving end of the delivery conveyor is supported by and movable up and down with the trough. The other end of the delivery conveyor, which is remote from the discharge end of the trough, is supported as at 25 on a fixed horizontal axis in a manner providing for up and down swinging motion of its receiving end.

In most instances, it is desirable to provide still another endless belt conveyor 27, trained about pulleys which rotate on fixed axes, and in endwise alignment with the delivery conveyor to receive boards therefrom and to conduct such boards to a station at which they may be stacked and stickered by other apparatus (not shown) prior to delivery to the kiln or storage yard.

From the description thus far it will be seen that boards from the stack in the boxcar 12 may be readily fed into the trough 10 of the apparatus of this invention and conducted by the feed, delivery, and fixed conveyors 21, 24 and 27 to a point remote from the stack in the boxcar, at which other apparatus (not shown) is employed to facilitate restacking of the lumber for further processing. It will also be apparent that a single operator working inside the boxcar and using a conventional hook can easily slide boards one by one from the top of the pile and onto the feed-off roller 15 which feeds the boards into the trough in the manner described.

Before describing the apparatus in more detail, it should be observed that the trough structure is movable bodily up and down as indicated in Figure 2, to enable the feed-off roll carried thereby to be disposed at a level close to that of the top boards 13 in the stack, so that they may be readily slid off the stack and onto the feed-off roll with a minimum of effort on the part of the workman. Thus, as the height of the stack of boards 13 diminishes, the trough and feed conveyor carried thereby may be lowered to reposition the feed-off roll in accordance with the lowered height of the stack of boards. It has been found that the trough must be provided with a range of vertical adjustment of about 7½ feet for this purpose.

It will be further observed by reference to Figure 1, that the trough structure is supported by a number of rails 29 therebeneath, with the rails extending substantially normal to the length of the trough and the siding 11, to provide for bodily movement of the trough structure back and forth toward and from its receiving position shown in Figure 1 at which it is directly adjacent to the side of a boxcar on the siding. When the trough structure is moved rearwardly on the rails away from the siding, adequate clearance is provided to enable a freight engine to run the boxcar to and from its unloading position shown.

Figures 3, 4:
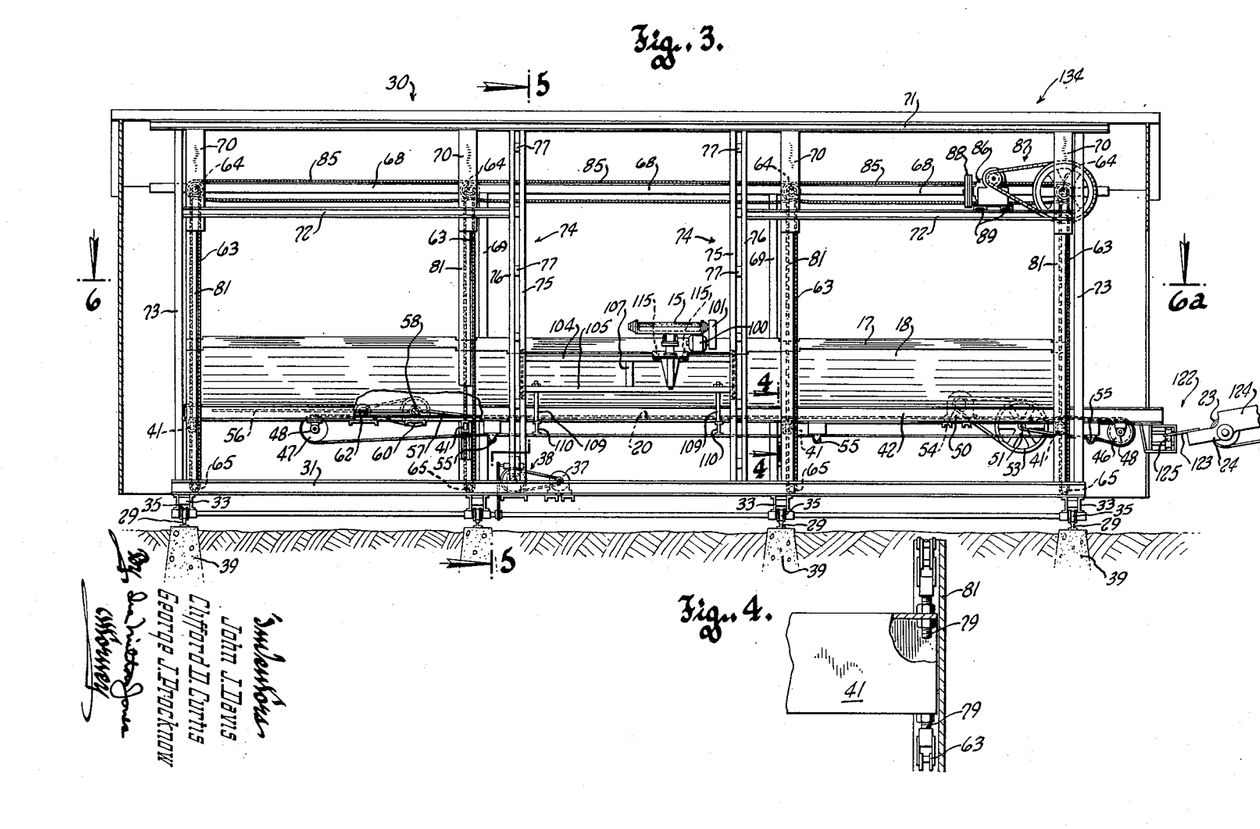
Figure 3 is an elevational view of the apparatus of this invention looking at the feed side thereof.
Figure 4 is an enlarged fragmentary detail view, partly in section and partly in elevation, taken along the line 4—4 of Figure 3.
Figure 5:
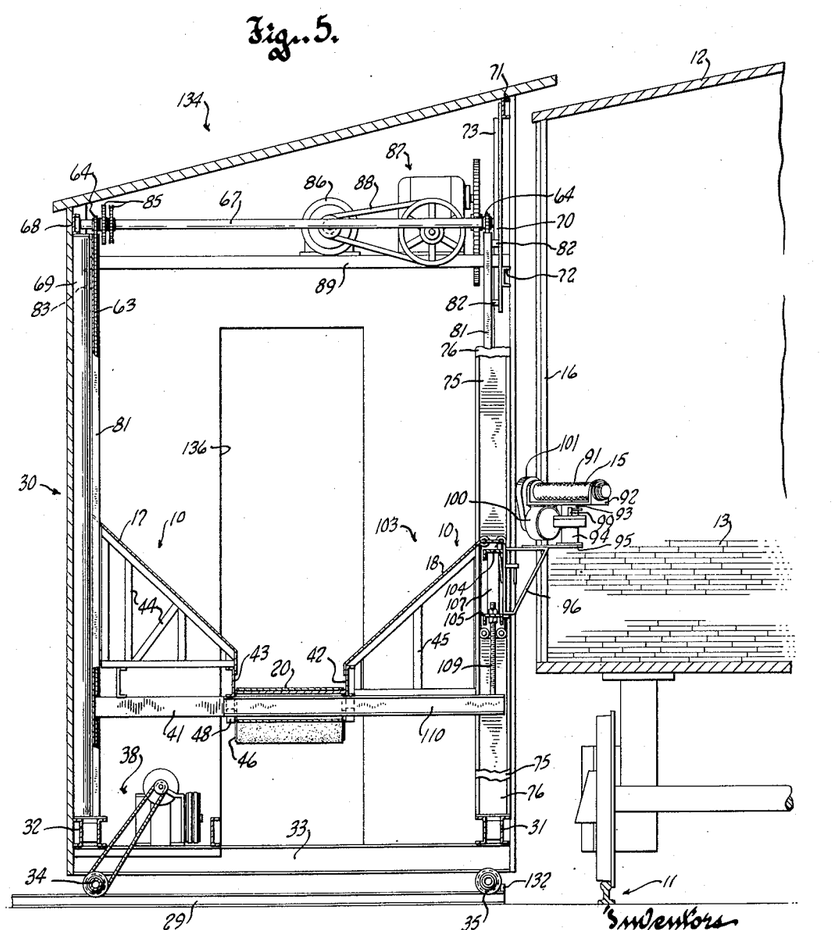
Figure 5 is a transverse sectional view of the lumber unloading apparatus taken through Figure 3 along the line 5—5 and showing the apparatus in a receiving position with its trough structure partly elevated, and directly adjacent to a boxcar containing lumber to be unloaded.

As seen best in Figures 3 and 5, the trough structure 10 is mounted on a carriage 30 comprising a rigid horizontally disposed rectangular framework consisting of front and back pairs of elongated channels 31 and 32, respectively, with the channels of each pair joined together in any suitable manner and resting on and secured to the ends of four substantially equispaced crossbeams 33, each likewise provided by pairs of channels connected together in any suitable manner. An elongated longitudinally extending shaft 34 is carried in bearings mounted on the undersides of the crossbeams 33, and flanged wheels 35 fixed on this shaft directly beneath each of the crossbeams ride upon the rails 29 to provide for movement of the carriage back and forth in a direction normal to the length of the carriage.

Rotation may be imparted to the shaft 34 as by means of a reversible electric motor 37 mounted on the carriage and drivingly connected with the shaft through a chain-drive speed reducing mechanism generally designated 38. It will also be understood that while the rails 29 are shown located at or close to ground level, they are preferably mounted on concrete piers 39 embedded in the ground.

The trough structure 10 likewise comprises an elongated horizontally disposed framework consisting of four substantially equispaced crossbeams 41 each located directly over one of the carriage crossbeams 33 and long enough to span the front and rear channels 31 and 32 of the carriage to be supported thereon in the lowered position of the trough structure. A pair of parallel spaced apart longitudinal channels 42 and 43 is mounted on the intermediate portions of the crossbeams 41 and these channels extend for the entire length of the trough. The channels 42 and 43, of course, are rigidly secured to the crossbeams 41, as by welding, to form a rigid framework therewith. These longitudinally extending channels are disposed with their backs opposing one another to define the sides of the trough at the bottom portion thereof, as seen best in Figure 5.

The side walls 17 and 18 of the trough have their lower ends bent over and connected to the backs of the channels, and diverge upwardly therefrom in the manner shown in Figure 5. In addition, the side walls are rigidly supported on the trough structure in the angular positions described by means of opposite truss-like brackets 44 and 45 disposed under the side walls 17 and 18, respectively, at locations directly over each of the cross beams 41 of the trough structure. These truss-like brackets, of course, are fixed with respect to the crossbeams and the longitudinal channels 42 and 43 which define the bottom portion of the trough, and have the side walls 17 and 18 joined to their sloping upper rails.

The feed or receiving conveyor 21, which is of the endless belt type, is trained over a drive pulley 46 adjacent to the outlet, or discharge end of the trough and a freely rotatable pulley 47 near the opposite end of the trough. As seen best in Figure 7, the shaft of each of these pulleys extends transversely beneath the channels 42 and 43 and is rotatably received in bearings 48 fixed to the undersides thereof. The shaft of the drive pulley projects rearwardly from its bearing and has a V pulley 49 fixed thereto to enable the same to be drivingly connected with an electric motor 50 supported by the trough structure in fixed relation thereto.

In the present case, belts connect the V pulley 49 with a smaller V pulley 51 fixed on a jack shaft 52, likewise journaled in bearings carried by the channels at the bottom of the trough, and this jack shaft carries a larger V pulley 53 which in turn is connected by belts with the drive pulley 54 on the shaft of the motor 50. The arrangement of V pulleys described has a speed reducing effect to cause travel of the feed or receiving conveyor at the desired rate.

The pulleys 46 and 47 are so positioned as to dispose the top stretch of the feed conveyor slightly above the level of the tops of the crossbeams 41 of the trough structure; and the diameters of the pulleys are such as to dispose the lower stretch of the conveyor belt beneath these crossbeams. A plurality of idler pulleys 55 may be provided on the underside of the trough structure at spaced locations along its length to take up excessive slack in the bottom stretch of the conveyor belt.

The width of the belt providing the feed or receiving conveyor substantially corresponds to the spacing between the opposing backs of the longitudinal channels 42 and 43 at the bottom of the trough. The motor 50, of course, drives the receiving conveyor in a direction such as to assure travel of its upper stretch, which forms the bottom of the trough, to the right as seen in Figures 1, 3, 6 and 6a, toward the discharge end of the trough.

Figures 5A, 7, 8:
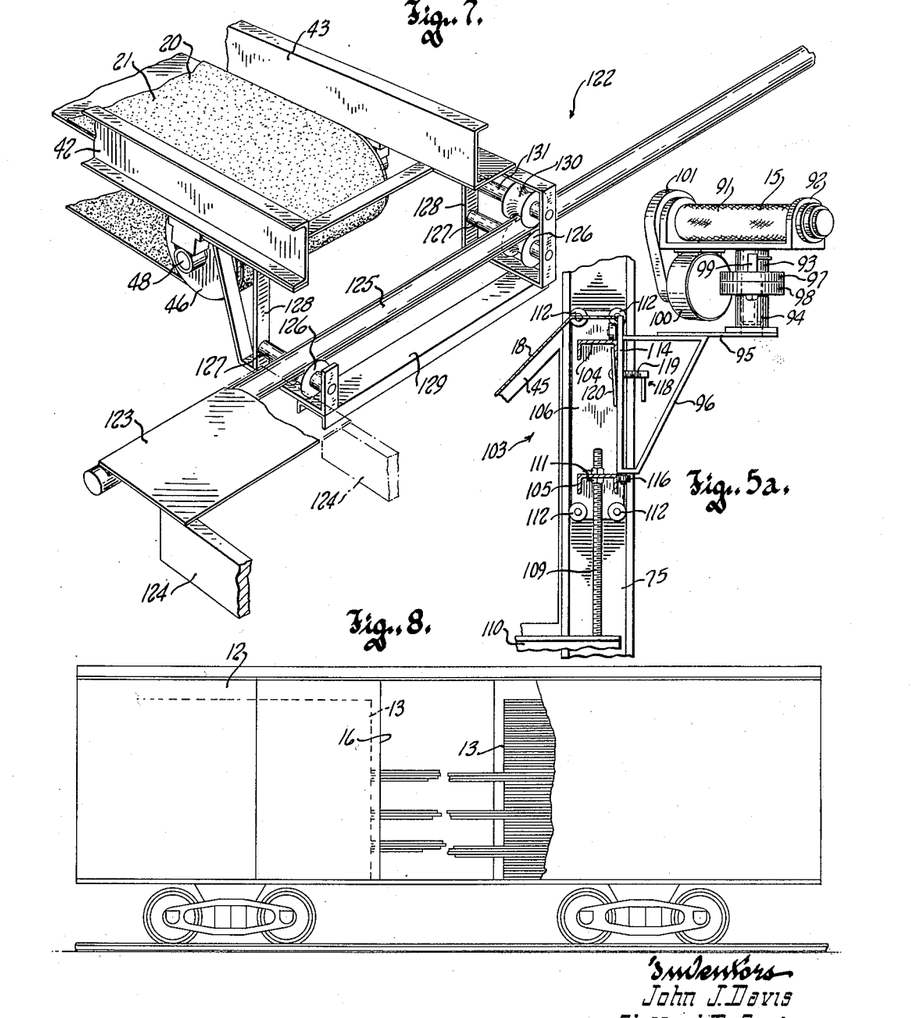
Figure 5a is an enlarged view of that portion of Figure 5 which relates to the feed-off roll and the manner in which it is supported on the trough structure.
Figure 7 is a detail perspective view of the discharge end of the trough and the adjacent end of the delivery conveyor, illustrating the novel coupling therebetween.
Figure 8 is a side elevational view of a conventional boxcar having portions thereof broken away to show the manner in which lumber is stacked in two piles therein for delivery to the processor.
Figure 6:
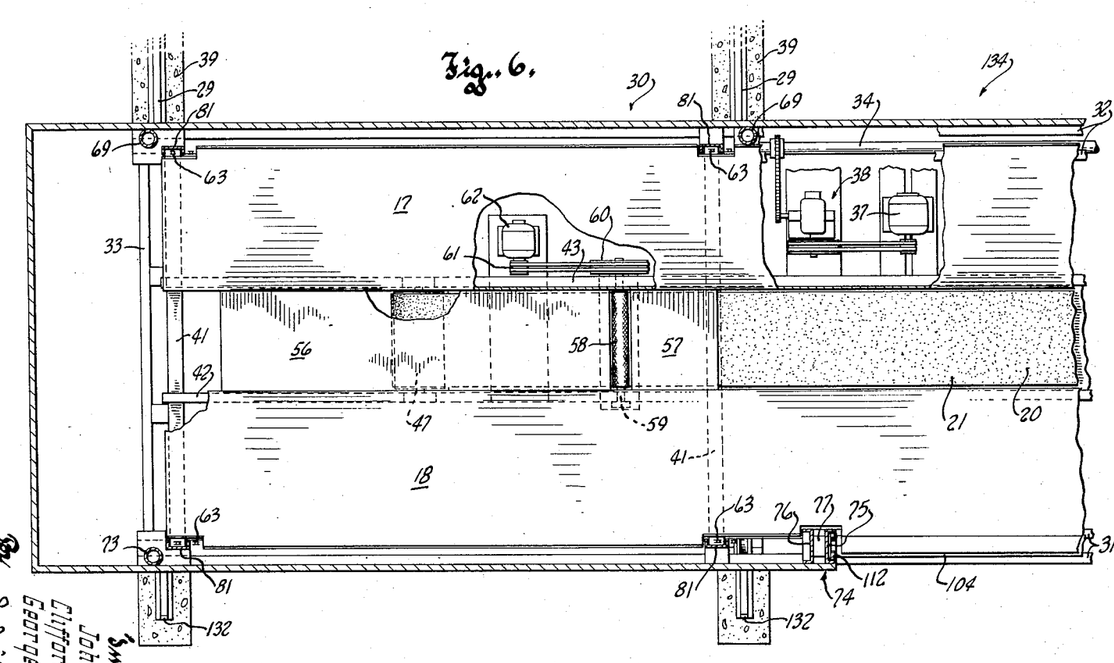
Figure 6A:
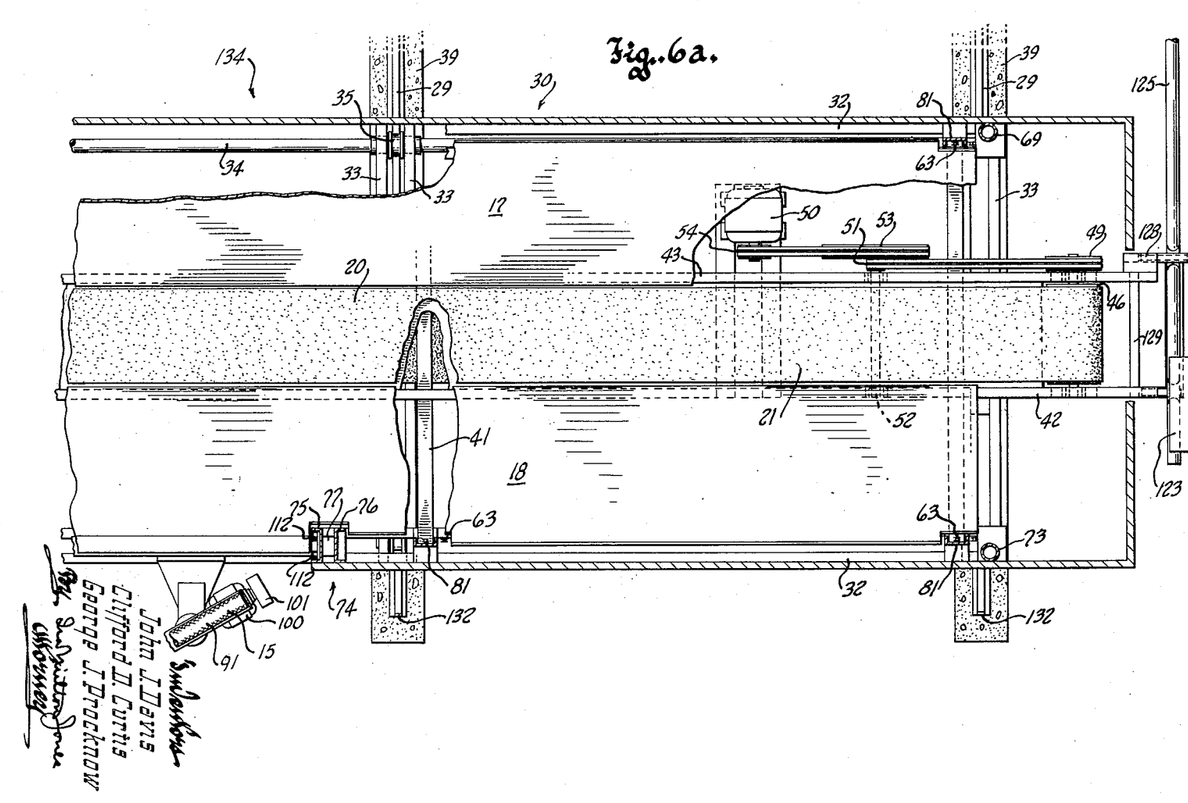

Figure 1 shows the feed-off roll 15 positioned adjacent to the end of the stack of boards located remote from the discharge end of the trough. However, boards are ordinarily stacked in piles at both ends of a boxcar for transit to the lumber processor, as indicated in Figure 8.

As will be described later, the feed-off roll 15 is not only movable up and down with the trough structure and thus positionable at or near the level of the top boards of the stack to be unloaded, but it is also supported for swiveling motion about a vertical axis so that it may be turned toward the stack of boards in either end of the boxcar to facilitate the unloading operation.

As long as the boards are propelled by the feed-off roll toward the discharge end of the trough in the manner indicated in Figure 1, there is little chance that damage to the top stretch 21 of the trough conveyor will result even though the boards may strike the same endwise or even cornerwise. This, of course, results from the fact that the boards are being propelled into the trough in the same direction that the top stretch 21 of the trough conveyor travels.

If the feed-off roll is adjusted about its vertical axis to a position at which it will propel boards unloaded from the second stack in the boxcar toward the opposite end of the feed trough, there is a possibility that the top stretch 21 of the trough conveyor might be seriously damaged if the boards should strike the same cornerwise or even endwise. To guard against such damage to the conveyor, a substantial length of its top stretch at the dead end portion of the conveyor is protected by floor plates 56 and 57 flatwise substantially closely overlying the top stretch 21. Both of these floor plates span the space between the trough channels 42 and 43 and are welded or otherwise rigidly secured to the trough.

The longer plate 56 extends from substantially the extreme left hand end of the trough to a point spaced a substantial distance beyond the freely rotatable pulley 47, and has its forward edge closely adjacent and parallel to the periphery of a live roller 58 extending transversely across the bottom of the trough just above the feed conveyor therein. The live roller 58 is fixed on a transverse shaft 59 having its ends journaled in the trough channels 42 and 43 for rotation on an axis crosswise of the trough and sufficiently far above the top stretch 21 of the trough conveyor as to assure clearance between the knurled periphery of the live roller and the top stretch of the conveyor.

The shorter floor plate 57 is disposed at the opposite side of the live roller 58 and, as shown best in Figure 3, may be slanted downwardly toward the discharge end of the trough to have its edge remote from the live roller as close as possible to the top stretch 21 of the trough conveyor.

Boards propelled by the feed-off roll 15 toward the end of the conveyor remote from its discharge end will, therefore, impinge one or the other of the floor plates 56 and 57 to assure against damage to the top stretch of the trough conveyor. Such boards will also rest partly upon the live roller 58, the purpose of which is to effect transfer of the boards from the floor plates onto the trough conveyor.

For this reason, the shaft 59 of the live roller projects rearwardly from the channel 43 and has a V pulley 60 fixed thereto so that V belts may be employed to drivingly connect the live roller with a smaller V pulley 61 on the shaft of an electric motor 62 suitably mounted on the trough structure. It will be understood, of course, that the motor 62 drives the live roller 58 clockwise, as viewed in Figure 3.

In order to provide for bodily up and down movement of the trough structure to enable the same to be positioned in correspondence with the height of the stack of boards being handled, the trough structure is suspended from sets of front and rear chains 63 connected with the opposite ends of the four crossbeams 41 at the bottom of the trough. These chains are trained about upper and lower sprockets 64 and 65 respectively. The lower sprockets 65 are mounted on stub shafts freely rotatably carried by the longitudinal beams 31 and 32 of the carriage substantially directly beneath the opposite ends of each of the crossbeams 41 of the trough. The upper sprockets 64 are fixed on the opposite end portions of shafts 67 extending transversely across the trough a substantial distance thereabove. The transverse shafts 67 are constrained to rotate on horizontal axes directly above and aligning with the axes of the lower sprockets 65, so that these shafts are also substantially in vertical alignment with each of the four crossbeams 41 at the bottom of the trough.

The rear end portions of each of the transverse shafts 67 are journaled in bearings carried by an elongated horizontal channel 68 fixed to the tops of a plurality of rigid upright posts 69 having their lower ends seated on and permanently fixed to the rear longitudinal beams 32 of the carriage. The front end portions of the transverse shafts 67 are journaled in bearings carried by upright plates 70 spanning and secured to vertically spaced horizontal channels 71 and 72. The upper channel 71 extends for the entire length of the apparatus and, similarly to the rear channel 68, is seated on and secured to the tops of four longitudinally spaced upright posts each of which has its lower end seated on and permanently secured to the front longitudinal beam 31 of the carriage.

The end posts 73 at the feed side of the apparatus are tubular, as are all of the rear posts 69, but the intermediate posts, generally designated 74, comprise two pairs of upright channel irons with the channels 75 and 76 of each pair disposed back to back and secured together in spaced apart relationship as by spacers 77. Also, while the posts at the rear of the apparatus are substantially equispaced from one another lengthwise of the trough, the post structures 74 at the feed side of the machine are spaced from one another a distance slightly less than the spacing of the corresponding posts at the rear of the apparatus.

It is important to note that the channels 72 which have the lower ends of the plates 70 secured thereto, extend between and are secured to only the outer channels 76 of the post structures 74 and the adjacent end posts 73 at the front of the apparatus. This leaves the space between the opposing channels 75 of the post structures 74 unobstructed by any permanent framework, for a purpose to be later described.

As stated previously, the trough structure is suspended from the chains 63 at the front and rear sides of the apparatus. While these chains may be said to be endless, one stretch of each chain, namely that which is in vertical alignment with the end of the adjacent crossbeam 41, is interrupted and the ends of the chain thus provided are secured to the end of the crossbeam by bolts 79 to permit whatever adjustment is necessary to assure leveling of the trough structure.

In order to guide the trough structure during up and down movement thereof, the opposite ends of its four crossbeams 41 project into and are slidingly received in the flanged sides of transversely opposite upright channels 81 having their lower ends seated on the longitudinal beams 31 and 32 of the carriage and rigidly secured thereto. The four guide channels at the feed side of the apparatus extend upwardly beyond the plates 70 and terminate just beneath those portions of the transverse shafts which project from these plates. The upper end portions of the front guide channels are rigidly secured to the plates 70 in any suitable manner, preferably with spacers 82 interposed therebetween.

The upper end portions of the rear channel guides 81 are similarly rigidly secured to the upper frame structure as by being welded or otherwise permanently attached to longitudinally extending channels 83 joined between each pair of upright posts 69.

With the construction described, it will be noted that the flanges of the guide channels loosely embrace the outer ends of the crossbeams 41 of the trough structure, as well as those stretches of the chains 63 which are secured to the ends of the crossbeams.

The trough structure may be either elevated or lowered bodily by imparting rotation in the desired direction simultaneously to all four shafts 67 having the upper sprockets 64 fixed thereon. For this purpose, each pair of adjacent shafts 67 is drivingly connected by an endless chain 85 and the shaft above the discharge end of the trough structure is driven by an electric motor 86, through a suitable speed reducing transmission, generally designated 87, connected by V belts 88 with the motor. The motor and transmission, of course, are mounted overhead, being seated on a pair of channels 89 extending transversely across the apparatus with their ends resting on and secured to the longitudinal channels 72 and 83.

It will be understood that the motor 86 is of the reversible type and when operated in one direction will effect elevation of the trough structure bodily. When the motor is operated in the opposite direction, the trough structure will be lowered. Suitable limit switches, not shown, may be provided to stop the elevating and descending motion of the trough structure and, as will be apparent, the lower limit switch is preferably set to be operated by a part on the trough structure just before its beams 41 seat on the longitudinal beams 31 and 32 of the carriage to define the lower position of the trough. The upper limit switch is placed to be actuated by a part on the trough structure during elevation thereof and as the trough structure reaches its maximum height of about 7½ feet above its lowered position.

It will also be understood that suitable switch mechanism (not shown) for controlling energization of the motor 86 governing the elevating and descending motion of the trough structure may be placed at the feed side of the apparatus near one or the other of the upright post structures 74 so as to be readily accessible to a workman unloading lumber from a boxcar.

As stated previously, the feed-off roll 15 is carried by the trough structure to move therewith during both elevating and descending motion of the trough structure. This enables the feed-off roll to be positioned at the most convenient height with respect to the top of the stack of boards being unloaded from the boxcar. In addition to such vertical adjustment, the feed-off roll is also mounted for bodily back and forth motion lengthwise of the trough structure, and for swiveling motion about a vertical axis to enable the roll to be used in the unloading of lumber from either of two stacks in a boxcar to be unloaded.

The feed-off roll per se comprises a cylinder 91 having its surface roughened as by knurling, mounted in a yoke 92 for rotation on a horizontal axis. A journal 93 secured to the underside of the yoke substantially medially of the ends of the cylinder 91, projects downwardly into a hollow upright bearing 94 on the outer end of an arm 95 forming part of a bracket 96.

Cooperating horizontal flanges 97 and 98 on the journal and the bearing 94, respectively, not only serve to hold the cylinder 91 spaced a predetermined distance above the arm 95, but make it possible to lock the feed-off roll in any desired position of rotation about the axis of its journal 93. A pair of latch devices 99 located at diametrically opposite sides of the journal may be provided to releasably clamp the cooperating flanges 97 and 98 together.

An electric motor 100 is provided to rotate the feed-off roll at a relatively high rate of speed in order to effectively propel boards placed thereon into the trough. This motor is mounted on the underside of the yoke 92 near one end of the cylinder 91, and the motor shaft is drivingly connected with the cylinder in any suitable manner, as for instance by a V belt, not shown, contained in a housing 101 which serves as a guard for the belt.

While it is possible to support the bracket 96 carrying the feed-off roll directly upon the adjacent side wall 18 of the trough structure, in the present case other supporting structure, general designated 103 is provided for this purpose. The supporting structure 103 comprises a pair of vertically spaced beams 104 and 105 extending lengthwise horizontally between the inner channels 75 of the two post structures 74, which it will be recalled, have their flanges facing toward one another. Plates 106 flatwise closely overlying the backs of the channels 75 and slidably fitting between the flanges thereof, are joined across the adjacent ends of the beams 104 and 105, to hold them rigidly connected together and in spaced apart relationship as shown. To further insure rigidity of the supporting structure, a vertical strut 107 is interposed between the beams 104 and 105 and has its ends welded or otherwise permanently secured thereto.

The supporting structure 103 is held in a position externally adjacent to the feed side of the trough by means which enables a degree of up and down adjustment of this supporting structure relative to the trough but constrains the supporting structure to move up and down with the trough. For this purpose a pair of upright rods 109 is provided to connect the supporting structure 103 with the framework of the trough. These rods have their lower ends seated on and attached to the outer end portions of transverse beams 110 secured across the undersides of the trough channels 42 and 43. The forward ends of the beams 110 lie beneath the supporting structure 103 a short distance inwardly of the ends thereof so as to be spaced slightly from the post structures 74.

The upper end portions of the rods 109 are threaded and pass upwardly through apertures in the lower beam 105 of the supporting structure 103; and a pair of nuts 111 threaded on each rod is employed to clamp the beam 105 therebetween to thus securely anchor the rod to the supporting structure. While the supporting structure 103 is shown held in its top limit of adjustment on the rods 109, it will be apparent that it may be lowered a maximum distance nearly equal to the spacing between its beams 104 and 105, or that it may be releasably held at any intermediate elevation by suitable manipulation of the nuts 111.

The supporting structure 103 is freely slidably guided for up and down motion by the channels 75 of the post structures 74 and, for this purpose, each of the plates 106 carries two pairs of rollers 112 having their peripheries tracking upon the inner surfaces of the adjacent channel flanges. In this manner, the supporting structure 103 is constrained to motion in a vertical plane with the trough structure whenever the latter is raised or lowered.

The bracket 96 which carries the feed-off roll 15 is provided with an upstanding leg 114 which overlies the fronts of the beams 104 and 105 of the supporting structure. The upper end of the leg 114 projects a short distance above the top beam 104 and carries a pair of longitudinally spaced rollers 115 which have their peripheries resting upon the top surface of the beam 104 and are freely rotatable on a transverse horizontal axis.

The lower end portion of the leg 114 of the bracket is bent outwardly away from the lower beam 105 of the supporting structure and carries a single roller 116 for rotation on a vertical axis with its periphery engaged with the outer side of the lower beam. In this manner the bracket is more or less suspended from the two beams of the supporting structure, while being capable of movement lengthwise along these beams in the space between the upright post structures 74.

The bracket 96 for the feed-off roll is not only held against displacement from the supporting structure 103, but is releasably locked thereto in any position of longitudinal adjustment along the beams 104 and 105 by means of a single clamp structure 118. This clamp structure comprises a screw 119 threaded into the upright leg 114 of the bracket at a location intermediate the top and bottom beams 104 and 105, and having a plate 120 loosely connected to its inner end portion so that the plate may be moved back and forth toward and from the rear of the upstanding leg 114 of the bracket. As seen best in Figures 5 and 5a, the lower edge portion of the plate 120 bears against the rear of the leg 114 and its upper edge portion bears against the inner surface of the downwardly projecting front flange of the channel iron of which the upper beam 104 is comprised.

Assuming the clamping screw 119 to have a right-hand thread, the plate 120 is brought to its clamping position shown in which it locks the bracket 96 to the supporting structure and against longitudinal motion relative thereto by rotation of the clamping screw in a direction tending to back it out of its threaded hole in the leg 114 of the bracket. The bracket may be readily released, however, for horizontal adjustment along the side of the trough merely by turning the clamping screw 119 into its threaded hole in the leg 114 the short distance necessary to loosen the clamp plate 120.

As stated previously, not only is the trough structure mounted for up and down motion on the carriage 30, but it is also movable back and forth bodily with the carriage in directions normal to the length of the trough. Moreover, when the lumber unloading apparatus of this invention is in operation, the feed conveyor carried by the trough structure must always be in endwise alignment with the delivery conveyor 24 shown in Figures 1 and 2 and in a position to assure smooth transfer of boards from the trough conveyor to the delivery conveyor, regardless of the elevation at which the trough may be operating.

For this purpose, the end of the delivery conveyor remote from the discharge end of the trough is trained over a drive pulley which rotates on a fixed axis and is supported in a manner providing for up and down swinging motion of the receiving end of the delivery conveyor as indicated in Figure 2. This indicates the desirability of connecting the adjacent ends of the trough and delivery conveyors so that the latter will swing up and down with the trough whenever the trough is elevated or lowered. An ordinary connection between the discharge end of the trough and the receiving end of the delivery conveyor, however, will not suffice for the reason that the entire unloading apparatus of this invention, exclusive of the delivery conveyor, must be movable back and forth to and from its receiving position close to the siding 11 at times when boxcars loaded with lumber are brought to the unloading station on the siding or unloaded boxcars are moved away from the unloading station by means of the usual freight engine.

For this reason, a novel coupling generally designated 122 is provided between the discharge end of the trough and the receiving end of the delivery conveyor to assure up and down swinging motion of the latter with the trough and to allow back and forth travel of the trough relative to the delivery conveyor whenever the carriage drive mechanism is operated. This connection comprises a flat plate 123 fixed to the rigid trough-like framework 124 of the delivery conveyor and projecting from the receiving end of the latter toward the adjacent end of the trough structure. At its underside an elongated shaft 125 is fixed to the plate 123 near the edge thereof which lies closest to the discharge end of the trough to nearly span the space between the latter and the receiving end of the delivery conveyor. As seen best in Figure 1, the shaft 125 projects across the adjacent end of the trough and normally extends rearwardly beyond the trough a distance at least corresponding to the range of back and forth motion of the trough carriage 30.

The shaft 125 rests on a pair of spools 126 each freely rotatably journaled on and slidable axially along a pin 127 carried by a bracket 128 fixed to the underside of each of the trough channels 42 and 43, the brackets projecting slightly beyond the discharge end of the trough toward the receiving end of the delivery conveyor. These brackets are rigidly joined to one another by a crossbar 129 extending across and secured to their undersides at the outer end portions of the brackets.

As seen best in Figure 7, the pins 127 carrying the spools are disposed on axes which are parallel to the trough channels and to one another, but located a short distance beneath the undersides of the trough channels. At the feed side of the machine only one such spool 126 is needed but at the opposite side of the trough a second spool 130 is provided to cooperate with the spool 126 therebeneath to substantially encircle the shaft 125. The upper spool 130, of course, is likewise freely rotatable and axially slidably mounted on a pin 131 carried by its bracket with the pin parallel to and spaced above the lower pin 127.

The bracket 128 at the feed side of the trough provides a cantilever type mounting for the pin and roller 126 thereon, and thus clears the plate or apron 123 on the receiving end of the delivery conveyor. The other bracket which is suspended from the trough channel 43, however, may be more or less rectangular in side elevation as there is no need to provide clearance between it and the receiving end of the delivery conveyor.

With the connection described, the trough structure can move bodily in directions parallel to the shaft 125 on the delivery conveyor, relative to the latter, without interference from the plate 123 on the latter. During such bodily movement of the trough structure, its discharge end rides along the shaft 125, without becoming disconnected therefrom, the spools rotating freely on their axes during motion of the carriage 30 and the trough thereon.

In addition, since the shaft 125 rests on the two lower spools 126 and is substantially embraced by the spool 130 and its cooperating spool 126 therebeneath, a motion transmitting connection is provided between the discharge end of the trough and the receiving end of the delivery conveyor through the shaft 125 to cause the receiving end of the delivery conveyor to swing up and down about the axis of its remote end whenever the trough structure is elevated and lowered. During up and down motion of the receiving end of the delivery conveyor with the trough, it will be appreciated that the spools 126 and 130 will ride axially back and forth along their pins 127, due to the fact that the shaft 125 on the delivery conveyor travels in an arc while the trough structure moves straight up and down.

It will also be understood that stops 132 (see Figure 5), may be provided at the forward ends of the rails 29 which support the carriage 30 to cooperate with the wheels 35 thereon in defining the receiving position of the carriage at which the trough structure carried thereby will align endwise with the delivery conveyor.

Though not illustrated in detail, the apparatus of this invention is preferably enclosed in a shed-like structure, generally designated 134, mounted on the carriage and built around the posts 69, 73 and 74 thereof, to protect the mechanism as well as lumber being handled from the weather. This shed structure, of course, moves back and forth with the carriage. Similarly, suitable stationary sheds are built around the delivery conveyor 24 and the fixed conveyor 27, but these have not been illustrated.

It will suffice to note that the shed 134 enclosing the trough structure and associated mechanism, is provided with an enlarged opening at its feed side substantially coextensive in size with the space bounded by the upright post structures 74 to enable boards to be fed into the trough by the feed-off roll 15, and that an opening 136 is formed in the end of the shed at the discharge end of the trough structure and through which the latter projects for connection to the receiving end of the delivery conveyor in the manner indicated in Figure 6a.

Other access openings may be provided wherever necessary to enable servicing of the carriage drive motor and transmission means, as well as the drive motor for the live roller 61, both of which are located under the sides of the trough structure.

From the foregoing description taken together with the accompanying drawings, it will be readily apparent to those familiar with the processing of lumber received in carload lots, that the apparatus of this invention greatly speeds the unloading of the lumber from the cars and in addition eliminates much of the manual handling of the lumber heretofore necessary.

What we claim as our invention is:

1. Apparatus for transferring boards from a stack thereof to a point remote from the stack, comprising: an elongated trough; endless conveyor means in the bottom of the trough for conducting boards fed into the trough from a stack of boards lengthwise adjacent to the trough, along the length of the trough and out one end thereof; a power driven feed-off roll carried by the trough adjacent to an upper edge thereof and at a fixed elevation with respect to said conveyor means, said roll being rotatable on a horizontal axis generally crosswise of the trough so that boards from a stack endwise adjacent to the feed-off roll may be slid onto the feed-off roll and fed thereby into the trough toward one end of the trough; and means mounting the trough for up and down adjusting motion to provide for positioning of the feed-off roll at an elevation substantially corresponding to that of the top boards on the stack to enable such top boards to be readily slid endwise onto the feed-off roll and fed into the trough thereby, said last named means providing for downward adjustment of the trough to enable the feed-off roll thereon to be repositioned in accordance with the level of the top boards on the stack as the height of the stack diminishes.

2. The apparatus set forth in claim 1 wherein said trough is provided with opposite longitudinally extending side walls which converge toward said conveyor means; further characterized by the provision of crossbeams rigidly joining said side walls at a level adjacent to said conveyor means; and further characterized by the fact that said feed-off roll is supported by certain of said crossbeams adjacent to one of said side walls of the trough, intermediate the ends of the trough, for adjustment about a vertical axis to provide for the feeding of boards toward either end of the trough depending upon the position of adjustment of the feed-off roll about said vertical axis.

3. Apparatus for transferring boards from a railroad car having the boards stacked lengthwise therein, to a point remote from said car, comprising: an elongated carriage; an elongated trough on said carriage extending lengthwise thereof; endless conveyor means in the bottom of the trough for conducting boards fed into the trough along the length of the trough and out one end thereof; means mounting the carriage for motion in opposite directions substantially normal to the length of the trough thereon so as to enable the trough to be moved toward and from a receiving position at which one side of the trough is closely lengthwise adjacent to one side of a railroad car containing a stack of boards to be unloaded; a power driven feed-off roll mounted on the trough adjacent to the upper edge of said side thereof and at a fixed elevation with respect to the conveyor means in the bottom of the trough, said feed-off roll being rotatable on a horizontal axis generally crosswise of the trough and being operable to propel boards into the trough as a consequence of placement of one end portion of such boards on the feed-off roll; and means mounting the trough on the carriage for up and down motion of the trough, the conveyor means, and the feed-off roll in unison to enable the feed-off roll to be disposed at a level near that of the top of the stack of boards being fed to the trough, said last named means providing for downward adjustment of the trough to reposition the feed-off roll in accordance with the level of the top boards on the stack as the height of the stack diminishes.

4. Lumber handling apparatus, comprising: an elongated trough; conveyor means carried by the trough and comprising an endless belt having its upper stretch disposed lengthwise in the lower portion of the trough to provide the bottom of the trough; means for driving said conveyor means so that lumber fed into the trough will be carried toward and out one end of the trough by the top stretch of the belt; a power driven feed-off roll for feeding lumber into the trough; means mounting said feed-off roll on one side of the trough, intermediate its ends, for rotation on a horizontal axis and for bodily rotary motion about a vertical axis to enable the feed-off roll to be set in alternate positions of adjustment about its vertical axis to effect feeding of lumber placed upon the roll into the trough toward either end thereof; plate means fixed in the bottom of the trough at the opposite end portion thereof and overlying a substantial length of the top stretch of the conveyor belt for protecting the same when lumber is fed into the trough by the feed-off roll in a direction counter to the travel of said top stretch of the belt, said plate means being interrupted at a location intermediate its ends; and a power driven live roller mounted in the bottom portion of the trough with its periphery projecting above the top stretch of the conveyor belt and in the space provided by the interruption in said plate means, for propelling lumber deposited upon said plate means onto the top stretch of the conveyor belt.

5. In lumber handling apparatus of the character described: an elongated trough structure; endless conveyor means mounted on the trough structure in the bottom thereof for conducting lumber fed into the trough structure lengthwise therealong and out one end of the trough structure; a power driven feed-off roll mounted on the trough adjacent to the upper edge of one side thereof and at a fixed elevation with respect to the conveyor means in the bottom of the trough, for propelling boards into the trough as a consequence of placement of one end portion of such boards on the feed-off roll; an endless delivery conveyor for receiving lumber conducted out of the trough structure by the conveyor means therein, said delivery conveyor having its receiving end adjacent to the discharge end of the trough structure, and its opposite end being remote from the trough structure and providing a hinge disposed on a horizontal axis about which the receiving end of the delivery conveyor may swing up and down; means mounting the trough structure and the feed-off roll for bodily up and down motion in unison; and means connecting the discharge end of the trough structure with the receiving end of the delivery conveyor whereby the latter is constrained to swing up and down with the trough structure during elevation and lowering thereof.

6. In lumber handling apparatus of the character described: an elongated trough structure; endless conveyor means in the bottom of said trough structure for conducting lumber fed thereinto lengthwise along the trough structure and out one end thereof; an endless delivery conveyor for receiving lumber conducted out of the trough structure by the conveyor means therein, said delivery conveyor having its receiving end adjacent to the discharge end of the trough structure, and its opposite end being remote from the trough structure and providing a hinge disposed on a horizontal axis about which the receiving end of the delivery conveyor may swing up and down; means mounting the trough structure for bodily movement in opposite directions transversely of its length to and from a transferring position aligning endwise with the delivery conveyor; means mounting the trough structure for bodily up and down movement; and means coupling the discharge end of the trough structure with the receiving end of the delivery conveyor whereby the latter is constrained to swing up and down with the trough structure and the trough structure is free to move bodily transversely of its length, relative to the delivery conveyor, to and from said transferring position of the trough structure.

7. In lumber handling apparatus of the character described: an elongated carriage; means constraining the carriage to back and forth movement in directions normal to its length; pairs of longitudinally spaced transversely opposite upright guides fixed to the opposite longitudinal edge portions of said carriage; an elongated trough structure supported by said carriage lengthwise thereover and including opposite elongated downwardly converging side walls, conveyor means in the bottom portion of the trough structure to receive boards passing downwardly between the converging lower portions of the side walls, and a number of cross beams fixed on the trough structure at its underside and rigidly joining said side walls, said cross beams having their opposite ends slidingly engaged with said upright guides on the carriage to mount the trough structure for up and down motion on the carriage; an overhead structure carried by said carriage at an elevation a substantial distance above the trough structure, said overhead structure including a number of shafts each rotatable on a horizontal axis substantially in vertical alignment with one of said cross beams on the trough structure; motion transmitting connections between said overhead shafts and the end portions of said cross beams whereby rotation of the shafts in one direction effects lifting of the trough structure and rotation of the shafts in the opposite direction effects lowering of the trough structure; means drivingly connecting adjacent pairs of shafts to constrain the same to rotate in unison in like directions; and drive means connected with one of said shafts for imparting rotation to all of said shafts simultaneously in either direction.

8. In lumber handling apparatus of the character described: an elongated trough structure including conveyor means in the bottom portion thereof, and having a number of crossbeams fixed on the trough structure at its underside; a supporting structure for said trough structure including a rigid elongated framework horizontally disposed lengthwise beneath the trough structure, said supporting structure including pairs of longitudinally spaced transversely opposite upright guides fixed to the opposite longitudinal edge portions of said framework and between which the trough structure is received with the end portions of said crossbeams thereof slidingly engaged with said upright guides to mount the trough structure for bodily up and down motion on said supporting structure; power driven means mounted on said supporting structure and connected with said crossbeams of the trough structure for effecting lifting and lowering of the trough structure; a power driven feed-off roll for feeding lumber into the trough structure; and means mounting said feed-off roll adjacent to one side of the trough structure near the upper edge thereof and intermediate the ends of the trough structure, said last named means comprising a pair of spaced apart beams fixed to the underside of the trough structure and projecting laterally outwardly therefrom toward said side of the trough structure, longitudinally extending supporting means resting on and secured to the outer ends of said last named beams, a bracket connecting the feed-off roll to said supporting means, and rigid longitudinally spaced upright post structures fixed on said horizontally disposed framework adjacent to said side of the trough structure and alongside the longitudinal ends of said supporting means, said post structures providing guides in which the longitudinal ends of said supporting means are slidingly engaged to guide the same and the power driven feed-off roll thereon for up and down motion with the trough structure but independently of the guides for the trough structure.

9. The lumber handling apparatus set forth in claim 8 further characterized by the provision of a shed supported by and built around said supporting structure, said shed having an opening at one end thereof through which the adjacent end of the trough structure projects, and having an access opening at the side thereof which is adjacent to the power driven feed-off roll and substantially coextensive with the area bounded in part by said upright post structures.

10. Lumber handling apparatus, comprising: an elongated trough; conveyor means carried by the trough and comprising an endless belt having its upper stretch disposed lengthwise in the lower portion of the trough to provide the bottom of the trough; means for driving said conveyor means so that lumber fed into the trough will be carried toward and out one end of the trough by the top stretch of the belt; a power driven feed-off roll for feeding lumber into the trough; means mounting said feed-off roll on one side of the trough, intermediate its ends, for rotation on a horizontal axis and for bodily rotary motion about a vertical axis to enable the feed-off roll to be set in alternate positions of adjustment about its vertical axis to effect feeding of lumber placed upon the roll into the trough toward either end thereof; plate means fixed in the bottom of the trough at the opposite end portion thereof and overlying a substantial length of the top stretch of the conveyor belt for protecting the same when lumber is fed into the trough by the feed-off roll in a direction counter to the travel of said top stretch of the belt, said plate means having an inner end terminating at a point intermediate the ends of the trough; and a power driven live roller mounted in the bottom portion of the trough with its periphery projecting above the top stretch of the conveyor belt and adjacent to the inner end of said plate means, for propelling lumber deposited upon said plate means onto the top stretch of the conveyor belt.

References Cited in the file of this patent

UNITED STATES PATENTS

| | | |
|---|---|---|
| 1,447,316 | Mickelson | Mar. 6, 1923 |
| 1,461,707 | Hanson et al. | July 10, 1923 |
| 2,494,103 | Penberthy | Jan. 10, 1950 |